US010467487B1

(12) United States Patent
Wang et al.

(10) Patent No.: US 10,467,487 B1
(45) Date of Patent: Nov. 5, 2019

(54) FUSION-BASED TRAFFIC LIGHT RECOGNITION FOR AUTONOMOUS DRIVING

(71) Applicants: Chongqing Jinkang New Energy Automobile Co., Ltd., Chongqing (CN); SF Motors Inc., Santa Clara, CA (US)

(72) Inventors: Fan Wang, Santa Clara, CA (US); Huajun Chai, Santa Clara, CA (US); Ke Huang, Santa Clara, CA (US); Saurabh Singh, Santa Clara, CA (US); Rui Yu, Santa Clara, CA (US); Yifan Tang, Santa Clara, CA (US)

(73) Assignees: CHONGQING JINKANG NEW ENERGY AUTOMOBILE CO., LTD., Chongqing (CN); SF MOTORS INC., Santa Clara, CA (US)

( * ) Notice: Subject to any disclaimer, the term of this patent is extended or adjusted under 35 U.S.C. 154(b) by 0 days.

(21) Appl. No.: 16/216,731

(22) Filed: Dec. 11, 2018

(51) Int. Cl.
*G06K 9/00* (2006.01)
*G06K 9/62* (2006.01)
*G05D 1/00* (2006.01)
*B60R 1/00* (2006.01)
*G05D 1/02* (2006.01)

(52) U.S. Cl.
CPC ......... *G06K 9/00825* (2013.01); *B60R 1/005* (2013.01); *G05D 1/0088* (2013.01); *G05D 1/0231* (2013.01); *G06K 9/6262* (2013.01); *G06K 9/6292* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,751,154 | B2 * | 6/2014 | Zhang | B60W 30/09 701/411 |
| 9,037,519 | B2 * | 5/2015 | Han | G06N 3/0454 706/12 |
| 9,779,314 | B1 * | 10/2017 | Wendel | G06K 9/00825 |
| 9,892,332 | B1 * | 2/2018 | Wendel | G06K 9/00825 |
| 2008/0273752 | A1 * | 11/2008 | Zhu | B60W 40/02 382/103 |
| 2010/0100268 | A1 * | 4/2010 | Zhang | B60W 30/09 701/25 |
| 2013/0272968 | A1 * | 10/2013 | Otto | C07K 16/2869 424/10.1 |
| 2014/0114885 | A1 * | 4/2014 | Han | G06N 3/0454 706/12 |

(Continued)

*Primary Examiner* — Nancy Bitar
(74) *Attorney, Agent, or Firm* — Kilpatrick Townsend & Stockton LLP

(57) ABSTRACT

Various arrangements are presented for determining a state of a traffic light. A first analysis of a scene may be performed that includes the traffic light. The first analysis may result in the output of a first classification result and a first confidence score. A second, different analysis of the scene may be performed that also outputs a classification result and a confidence score. A fusion process may be performed to fuse the classification results into a fused classification result based on the confidence scores and one or more weighting metrics. A vehicle may then be driven at least partially based on the fused classification result.

18 Claims, 5 Drawing Sheets

(56) References Cited

U.S. PATENT DOCUMENTS

| | | | |
|---|---|---|---|
| 2017/0236037 A1* | 8/2017 | Rhoads | G06K 9/00208 |
| | | | 382/103 |
| 2017/0287233 A1* | 10/2017 | Nix | G07C 5/008 |
| 2017/0305434 A1* | 10/2017 | Ratnasingam | B60W 40/09 |
| 2019/0012551 A1* | 1/2019 | Fung | G06K 9/00825 |

* cited by examiner

FUSION-BASED TRAFFIC LIGHT RECOGNITION FOR AUTONOMOUS DRIVING

BACKGROUND

For autonomous driving systems and driver-assistance systems to safely pilot vehicles, the systems may need to be able to determine the current state of road conditions with a high degree of accuracy, including conditions that were initially intended for use by a human. For example, throughout the world, the color that a traffic light is illuminated is used to determine whether a vehicle is permitted to proceed into an intersection or is required to stop before entering the intersection. An autonomous driving system or driver-assistance system controlling the vehicle may need to determine the state of a traffic light in order to safely control the vehicle in the vicinity of the intersection.

SUMMARY

Various embodiments are described related to a method for determining a state of a traffic light. In some embodiments, a method for determining a state of a traffic light is described. The method may include performing, by an onboard vehicle processing system, a first analysis of a scene that includes the traffic light. The first analysis may output a first classification result and a first confidence score. The method may include performing, by the onboard vehicle processing system, a second analysis of the scene that includes the traffic light. The second analysis may differ from the first analysis. The second analysis may output a second classification result and a second confidence score. The method may include performing, by the onboard vehicle processing system, a fusion process to fuse the first classification result indicative of the state of the traffic light and the second classification result indicative of the state of the traffic light into a fused classification result. The fusion process may be based on the first confidence score, the second confidence score, and at least one weighting metric selected from a group consisting of an offline weighting metric and an online weighting metric. The method may include driving, by the onboard vehicle processing system, a vehicle at least partially based on the fused classification result.

Embodiments of such a method may include one or more of the following features: The first analysis may include using a computer vision analysis and the second analysis may include using a deep learning analysis. The first analysis additionally may output a first timestamp and the second analysis additionally may output a second timestamp. The first timestamp and the second timestamp may be compared to a defined time threshold to determine that the performed first analysis and the performed second analysis may be sufficiently recent. The offline weighting metric may be based on weather, distance, time-of-day, or some combination thereof. The online weighting metric may include determining that the first classification result may be different than the second classification result. The method may include, in response to determining the first classification result may be different than the second classification result, performing a traffic light sequence analysis to determine an expected classification result. The method may include comparing the expected classification result from the traffic light sequence analysis to the first classification result and the second classification result. The online weighting metric may include decreasing a first weighting of the first classification result based on the first classification result matching the expected classification result from the traffic light sequence analysis. The method may include increasing a second weighting of the second classification result based on the second classification result matching the expected classification result from the traffic light sequence analysis. The first weighting of the first classification result may be decreased if the first weighting is greater than a minimum weighting threshold. The first analysis may include analyzing a first image of the scene captured using a long-range image sensor and the second analysis may include analyzing a second image of the scene captured using a short-range image sensor.

In some embodiments, a system for determining a state of a traffic light is described. The system may include one or more image sensors attached with a vehicle. The system may include an onboard vehicle processing system, comprising one or more processors, that may receive images from the one or more image sensors. The onboard vehicle processing system may be located onboard the vehicle. The one or more processors may be configured to perform a first analysis of a scene from a first image received from the one or more image sensors that may include the traffic light. The first analysis may output a first classification result and a first confidence score. The one or more processors may be configured to perform a second analysis of the scene from a second image received from the one or more image sensors that includes the traffic light. The second analysis may differ from the first analysis. The second analysis may output a second classification result and a second confidence score. The one or more processors may be configured to perform a fusion process to fuse the first classification result indicative of the state of the traffic light and the second classification result indicative of the state of the traffic light into a fused classification result. The fusion process may be based on the first confidence score, the second confidence score, and at least one weighting metric selected from a group consisting of an offline weighting metric and an online weighting metric. The one or more processors may be configured to drive the vehicle at least partially based on the fused classification result.

Embodiments of such a method may include one or more of the following features: The first analysis may include the onboard vehicle processing system using a computer vision analysis and the second analysis comprises the onboard vehicle processing system using a deep learning analysis. The first analysis additionally may output a first timestamp and the second analysis additionally may output a second timestamp. The one or more processors may be further configured to compare the first timestamp and the second timestamp to a defined time threshold to determine that the performed first analysis and the performed second analysis may be sufficiently recent. The offline weighting metric may be based on weather, distance, time-of-day, or some combination thereof. The online weighting metric may include the one or more processors of the onboard vehicle processing system being configured to determine that the first classification result may be different than the second classification result. The system may perform a traffic light sequence analysis to determine an expected classification result in response to determining the first classification result may be different than the second classification result. The system may compare the expected classification result from the traffic light sequence analysis to the first classification result and the second classification result. The online weighting metric may further include the one or more processors of the onboard vehicle processing system being configured to decrease a first weighting of the first classification result based on the first classification result matching the expected classification result from the traffic light sequence analysis. The system may increase a second weighting of the second classification result based on the second classification result matching the expected classification result from the traffic light sequence analysis. The first weighting of the first classification result may be decreased if the first weighting is greater than a minimum weighting threshold. The first analysis may include the one or more processors being configured to analyze the first image of the scene captured using a long-range image sensor of the one or more image sensors and second analysis may include analyzing a second image of the scene captured using a short-range image sensor of the one or more image sensors. The first image and the second image may be the same image.

In some embodiments, a non-transitory processor-readable medium for determining the state of a traffic light is described. The medium may include processor-readable instructions configured to cause one or more processors to perform a first analysis of a scene from a first image that includes the traffic light. The first analysis may output a first classification result and a first confidence score. The medium may perform a second analysis of the scene from a second image that includes the traffic light. The second analysis may differ from the first analysis. The second analysis may output a second classification result and a second confidence score. The medium may perform a fusion process to fuse the first classification result indicative of the state of the traffic light and the second classification result indicative of the state of the traffic light into a fused classification result. The fusion process may be based on the first confidence score, the second confidence score, and at least one weighting metric selected from a group consisting of an offline weighting metric and an online weighting metric. The medium may cause a vehicle to be driven at least partially based on the fused classification result.

DETAILED DESCRIPTION OF THE INVENTION

Accurately recognizing a state (also referred to as a "classification") of a traffic light is of upmost importance for autonomous driving systems and driver-assistance systems. A typical traffic light has three states indicated by an illuminated light: green (proceed into intersection); yellow (stop if safe to do so, otherwise proceed into intersection); and red (stop before intersection). Other forms of traffic lights have additional states, including red, yellow, and green arrows, and blinking red, blinking yellow, and blinking green states. Regardless of which state is currently being output by the traffic light, it is imperative that the autonomous driving system or driver-assistance system determine the traffic light state accurately with an extremely high degree of accuracy. Incorrectly determining that the traffic light is green may result in the vehicle entering an interception when it is not safe or legal to do so. Incorrectly determining that the traffic light is red may result in the vehicle unexpectedly stopping, potentially triggering an accident or obstructing the intersection.

Embodiments detailed herein represent a fusion process for more accurately determining the current state of a traffic light. The fusion process detailed herein uses two or more scene analysis methods for determining the state of a traffic light. In some embodiments, the fusion process may subject the same or similar captured images of a traffic light to multiple scene analysis methods, such as computer vision and a deep learning process. In other embodiments, the fusion process may analyze images captured using different sensors, such as a short-range camera that has a wide viewing angle and a long-range camera that has a smaller viewing angle.

The fusion process may use varying offline weighting metrics, online weighting metrics, or both to evaluate the relative weights to be afforded to each scene analysis method used to evaluate the state of the traffic light. If each of the scene analysis methods arrives at a same result, the relative weighting of each method may be inconsequential. However, if one (or more) of the methods arrives at differing results, such a weighting may be determinative of the state that the traffic light is ultimately determined to be in by the fusion process. "Offline" metrics can include weighting a particular scene analysis method higher based on environmental conditions of the vehicle, such as distance to the traffic light, weather, time of day, lighting conditions, geopolitical region, and geographic location of the vehicle. "Online" metrics can include adjusting the weighting among methods as part of a feedback loop based on which method is determined to be correct when the methods create differing results.

Figure 1:
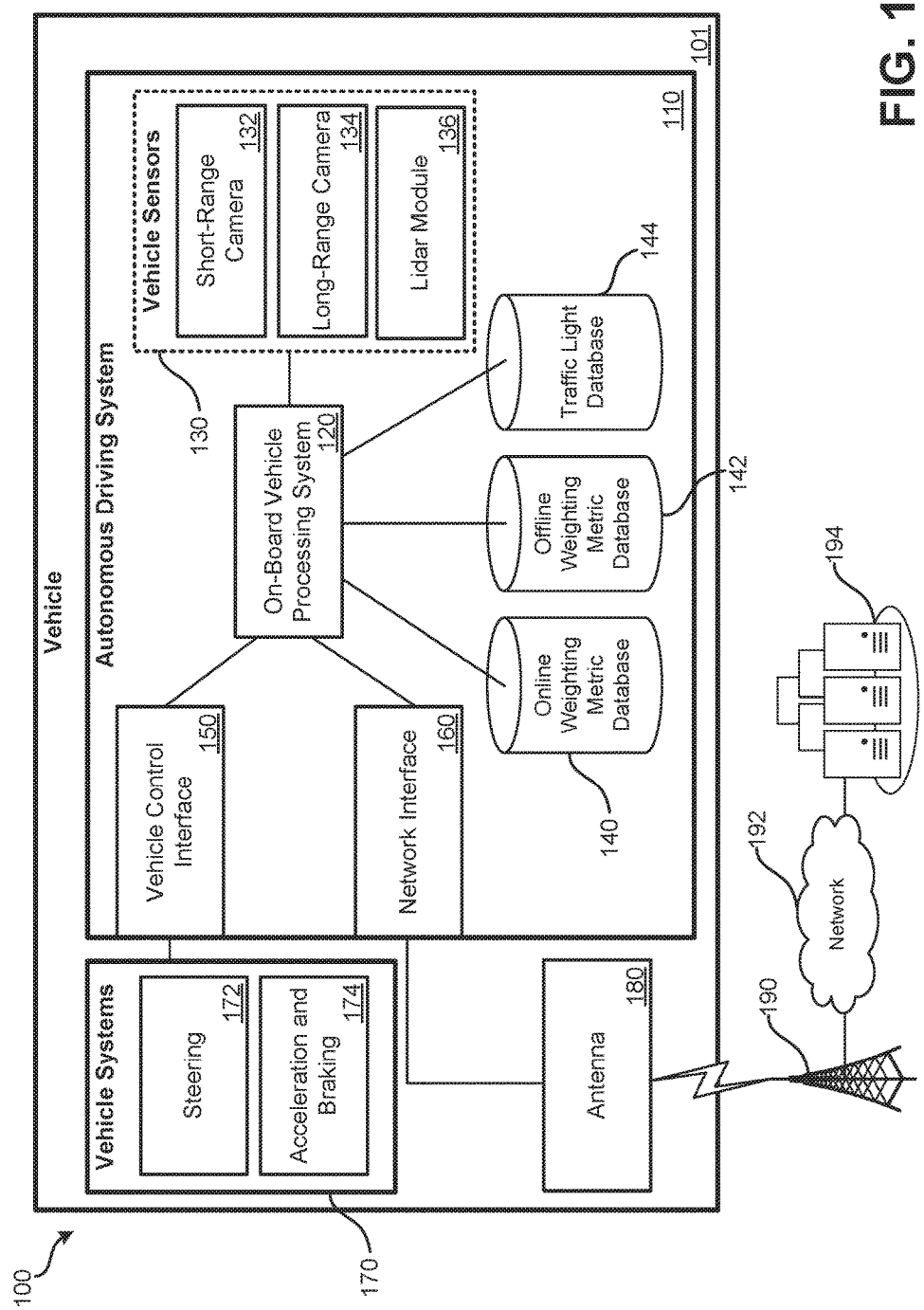
FIG. 1 illustrates a block diagram of an embodiment of an autonomous driving system.

Further details regarding these embodiments, plus additional embodiments, are detailed in relation to the figures. FIG. 1 illustrates a block diagram of an embodiment of an autonomous vehicle driving system 100. An "autonomous driving system" refers to a system that can drive or pilot a vehicle for a period of time without human input being needed for control of the vehicle. The systems and methods detailed herein may also be used in the form of a "driver-assistance system." A driver-assistance system may perform at least some of the tasks that are typically performed by a human driver or serve as a safety failsafe for situations in which a human driver has performed a likely mistaken or incorrect action while driving (e.g., failing to brake for a red traffic light, drifting out of a lane, failing to stop at an appropriate distance from an obstacle or stopped vehicle in the path of the driver's vehicle). Autonomous vehicle driving system 100 may include: vehicle 101; autonomous driving system 110; vehicle systems 170; antenna 180; cellular network 190; network 192; and cloud-based server system 194.

Vehicle 101 can refer to various forms of vehicles that can be controlled by an onboard autonomous driving system (or onboard driver-assistance system). Vehicle 101 may be a passenger car, pickup truck, sport utility vehicle, truck, motorized cart, all-terrain vehicle, motorcycle, powered scooter, or some other form of powered vehicle. Such a vehicle may be legal to operate on public roadways. Such vehicles may be configured to be controlled by a human driver (hereinafter a "driver"), an autonomous driving system (or driver-assistance system), or both. Therefore, at least in some vehicles, a driver may control the vehicle, while at other times the autonomous driving system may control the vehicle. Vehicle 101 may include vehicle systems 170. Vehicle systems 170 may include steering system 172 and acceleration and braking system 174. Each of these systems may be, at least at times, controlled using autonomous driving system 110. Other vehicle systems may also be present that may be, at least some of the time, controlled using autonomous driving system 110, such as a signaling system that indicates turns and lane changes of vehicle 101, and a lighting system to illuminate a roadway and to make vehicle 101 more visible.

Autonomous driving system 110 may include various sensors and computerized components that execute or function as various components detailed in FIG. 1. Such sensors and components can include: onboard vehicle processing system 120; vehicle sensors 130 (short-range camera 132, long-range camera 134, Lidar (Light Detection and Ranging) module 136); online weighting metric database 140; offline weighting metric database 142; traffic light database 144; vehicle control interface 150; and network interface 160. Of vehicle sensors 130, a short-range camera 132 may be present. Short-range camera 132 may be a visible light camera that has a field-of-view of the environmental scene in front of vehicle 101. Short-range camera 132 may include a wide-angle lens that results in a wide field-of-view. Therefore, short-range camera 132 may be especially useful for capturing an image that includes a large portion of the scene in front of the vehicle, but may be less useful for capturing details of objects (e.g., traffic lights) in the distance. Long-range camera 134 may also be a visible light camera that also has a field-of-view of the environmental scene in front of vehicle 101. However, long-range camera 134 may include a narrow-angle lens that results in a narrow field-of-view and provides optical and/or digital magnification greater than short-range camera 132. Therefore, long-range camera 134 may be especially useful for capturing an image that includes details of objects (e.g., a traffic light) in the distance in front of vehicle 101, but has a narrower field-of-view than short-range camera 132. While FIG. 1 illustrates only two cameras as part of vehicle sensors 130, additional cameras having different fields-of-view and pointed in different directions may be present. For example, additional cameras may include environmental scenes to the sides and rear of the vehicle. Similarly, such cameras may have different fields of view. Further, such additional cameras may capture electromagnetic radiation other than visible light, such as infrared light and ultraviolet light.

Vehicle sensors other than cameras may be present. For example, a Lidar module 136 may be used to determine the distance to objects in the environment of vehicle 101. Other forms of sensors may additionally or alternatively be present, such as a radar module, ultrasound sensor module, etc. Other sensors such as a rain sensor, GPS (or, more generally, GNSS) sensor, and light sensor may be present. For example, a GPS sensor may be used to determine a distance from vehicle 101 to a traffic light and what country, state, county, region, or geographic region a vehicle is located in. Regardless of which sensors are present, vehicle sensors 130 may transmit captured images and/or data to onboard vehicle processing system 120 for processing.

On-board vehicle processing system 120 may receive data from vehicle sensors 130 and may control vehicle systems 170 through vehicle control interface 150. On-board vehicle processing system 120 may further communicate with cloud-based server system 194 through network interface 160. On-board vehicle processing system 120 may access one or more databases or data stores of data that are stored locally as part of autonomous driving system 110 using one or more non-transitory processor-readable mediums, which can include memories, hard drives, and solid-state drives. On-board vehicle processing system 120 may include various computerized components, such as one or more processors and communication busses. The one or more processors used as part of onboard vehicle processing system 120 may include one or more specific-purpose processors that have various functionality hardcoded as part of the one or more processors, such as an application-specific integrated circuit (ASIC). Additionally or alternatively, one or more general-purpose processors may be used as part of onboard vehicle processing system 120 that execute stored instructions that cause the general-purpose processors to perform specific-purpose functions. Therefore, software and/or firmware may be used to perform at least some of the functions of onboard vehicle processing system 120. Further detail regarding the functioning of onboard vehicle processing system 120 is provided in relation to FIG. 2.

Vehicle control interface 150 and network interface 160 may serve to facilitate communications with onboard vehicle processing system 120. Vehicle control interface 150 may translate instructions or signals from onboard vehicle processing system 120 to control steering system 172, acceleration and braking system 174, and/or other onboard vehicle systems. Feedback from vehicle systems 170 (e.g., RPM, vehicle speed, engine status) may be provided by vehicle control interface 150 to onboard vehicle processing system 120. Network interface 160 may be used to facilitate communication between onboard vehicle processing system 120 and various external sources. In some embodiments, network interface 160 uses antenna 180 to wirelessly communicate with cellular network 190, which may be a 3G, 4G, 5G, or some other form of wireless cellular network. Cellular network 190 may use one or more networks 192, which can include the Internet, to communicate with a remote cloud-based server system 194. Cloud-based server system 194 may be operated by an entity that provides data to and receives data from autonomous driving system 110. For instance, cloud-based server system 194 may be operated by (or have operated on its behalf) a manufacturer or provider of autonomous driving system 110. Therefore cloud-based server system 194 may communicate with a large number (e.g., thousands) of autonomous driving systems 110 deployed in geographically-scattered vehicles. Network interface 160 may also be able to communicate with other forms of wireless networks. For instance, network interface 160 may be used to communicate with a wireless local area network (WLAN), such as a Wi-Fi network to which autonomous driving system 110 has permission to access. For example, when parked at a home, vehicle 101 may be within range of a vehicle owner's Wi-Fi network, through which the Internet and cloud-based server system 194 may be accessed. Other forms of network-based communication with cloud-based server system 194 are possible, such as a Bluetooth communication link via a vehicle occupant's mobile device to a cellular network or WLAN.

Online weighting metric database 140 may store data that is used to determine the weighting between different traffic light analysis methods. The online weighting metrics may be based on feedback based on actual traffic light classifications made by onboard vehicle processing system 120. Therefore, the metrics of online weighting metric database 140 may be based on actual driving performed by vehicle 101. Further detail regarding how online weighting metrics are obtained is provided in relation to traffic light fusion engine 230 and online weighting engine 240 of FIG. 2.

Offline weighting metric database 142 may store data that has been provided from an external source, such as from cloud-based server system 194 or was loaded into offline weighting metric database 142 at the time of manufacture or a previously-installed update.

Offline weighting metric database 142 may provide various weights that are to be used for allocating the weighting between different traffic light analysis methods. These weights may be determined based on the current conditions present at vehicle 101, such as: the time of day, the lighting conditions, a distance to a traffic light, the country in which vehicle 101 is operating, the weather, etc. Other possible environmental conditions are also possible. To determine the offline weightings, empirical data may have been gathered using a system similar to autonomous driving system 110 to determine in particular situations (such as those described above regarding the current conditions) which traffic light analysis method or methods are the most reliable and how the weighting should be apportioned when those conditions are present at vehicle 101. Offline weighting metric database 142 may periodically be updated by cloud-based server system 194.

Traffic light database 144 may indicate the location of where known traffic lights are located and may indicate the possible states (e.g., red, yellow, green, left green arrow, left red arrow, etc.) of the traffic light. Using traffic light database 144, onboard vehicle processing system 120 can identify intersections and other locations at which a traffic light can be expected to be present. Traffic light database 144 may include coordinates of known traffic lights. Traffic light database 144 may be updated by cloud-based server system 194.

Figure 2:
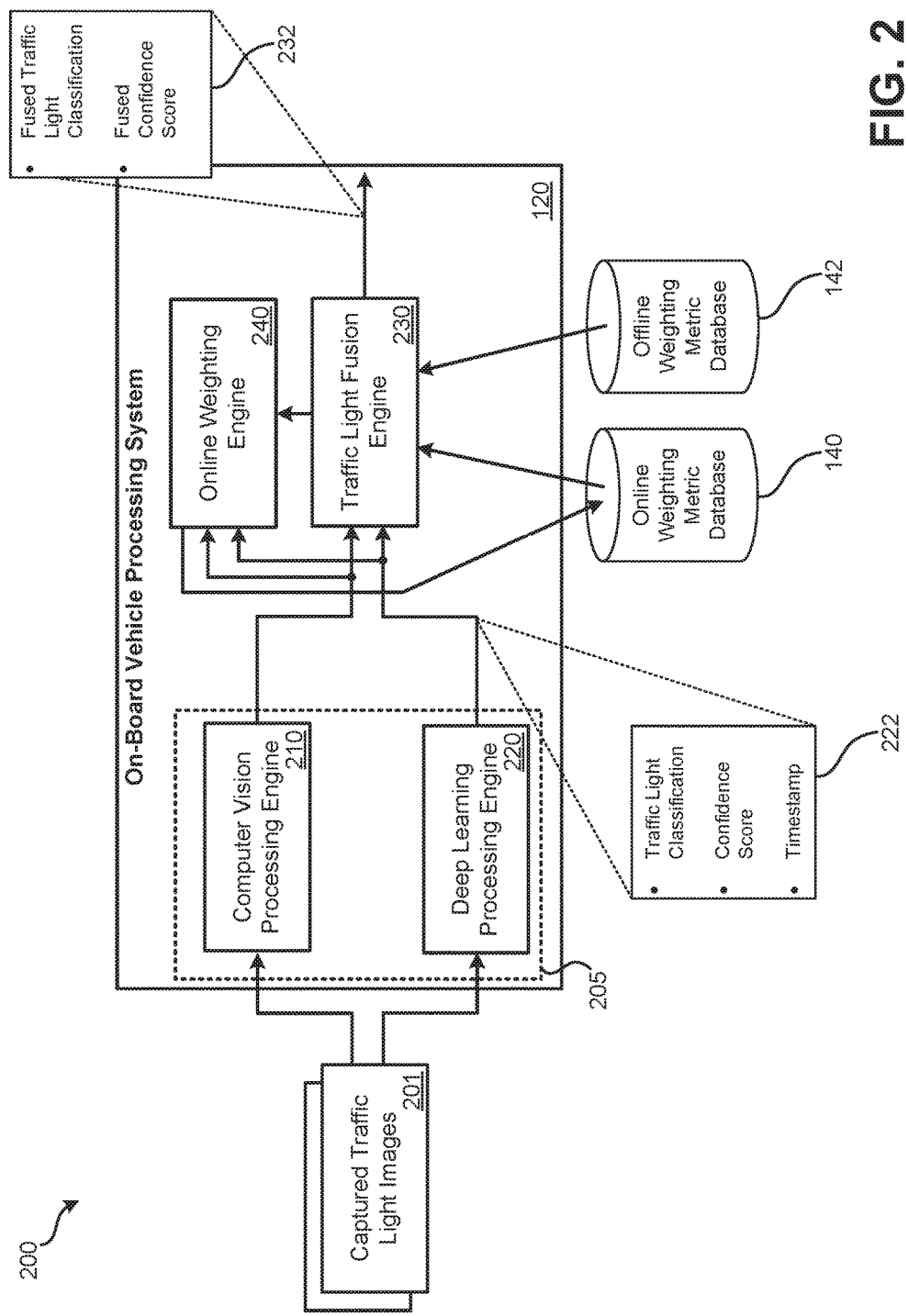
FIG. 2 illustrates a block diagram of an embodiment of an onboard processing system of an autonomous driving system.

FIG. 2 illustrates a block diagram of an embodiment 200 of onboard vehicle processing system 120 of an autonomous driving system. On-board vehicle processing system 120 may be part of autonomous driving system 110 or some other form of autonomous driving system. On-board vehicle processing system 120 may include various components, including: computer vision processing engine 210; deep learning processing engine 220; traffic light fusion engine 230; and online weighting engine 240. Further, components of onboard vehicle processing system 120 may communicate with online weighting metric database 140 and offline weighting metric database 142. As previously detailed, on-board processing system 120 may include various special-purpose or general-purpose processors. Components of onboard vehicle processing system 120 may be performed using such special-purpose or general-purpose processors. If general-purpose processors are used, the functionality of the detailed components of on-board vehicle processing system 120 may be implemented using specially-coded software that is executed by one or more general-purpose processors.

In the illustrated embodiment of FIG. 2, two scene analysis methods for analyzing the state of a traffic light are presented: computer vision processing engine 210 and deep learning processing engine 220. In other embodiments, alternative or additional scene analysis methods for analyzing the state of a traffic light may be present. Additionally or alternatively, rather than different scene analysis methods being used, the source of the images used in each method may be different. For example, in an embodiment, computer vision may be used for the analysis of different images captured using a short-range camera and a long-range camera. Various permutations of such embodiments are also possible. For example, rather than two analyses of analysis engine 205 being performed, a greater number of analyses may be performed, some of which use different source data, while others represent different methods of processing the source data.

In embodiment 200, captured images of a traffic light may be passed to both computer vision processing engine 210 and deep learning processing engine 220. The same images may be available to each of computer vision processing engine 210 and deep learning processing engine 220. For instance, captured traffic light images 201 may be captured using long-range camera 134.

Computer vision processing engine 210 and deep learning processing engine 220 may operate independently. Therefore, each may process a received image at a different speed and may output an indication of analysis data 222: 1) a traffic light classification; 2) a confidence score; and 3) a timestamp of when the processing was performed at different times. Items 1 and 2 may be in the form of a probability of each possible traffic light state. The possible light states may be determined from data stored in traffic light database 144 that indicates the possible traffic light states at various traffic lights. Alternatively, all traffic light states may be considered possible at each traffic light and a probability may be determined for each. A simpler scene analysis method that uses less processing power may be able to execute multiple times faster than a complex scene analysis method that uses significantly more processing power.

Computer vision processing engine 210 may perform a computer vision method of a received image from captured traffic light images 201. A computer vision process can involve acquiring, processing, analyzing, and understanding a received traffic light image. Computer vision involves extracting high-dimension data from a real world scene that includes a traffic light and output analysis data 222. For example, a possible way of using computer vision to perform traffic light recognition is detailed in "A Vision Based System for Traffic Lights Recognition," by Mehdi Salarian et al., published in "2015 SAI Intelligent Systems Conference (IntelliSys)", the entire disclosure of which is hereby incorporated by reference.

Deep learning processing engine 220 may perform a deep learning method on a received image from captured traffic light images 201. Deep learning processing engine 220 may be constructed in the form of a neural network through a supervised learning process. As part of the supervised learning process, a large number of images that include traffic lights in known states may be provided to a machine-learning system that analyzes the received images based on the known traffic light state (the output). Based on this supervised learning process, a neural network or other form of deep-learning structure may be created that can be incorporated as part of deep learning processing engine 220 to classify captured traffic light images 201 (for which the traffic light state is unknown). For example, a possible way of using deep learning to perform traffic light recognition is detailed in "A Deep Learning Approach to Traffic Lights: Detection, Tracking, and Classification," by Karsten Behrendt et al., published in "2017 IEEE International Conference on Robotics and Automation (ICRA)," the entire disclosure of which is hereby incorporated by reference.

The output from each analysis of analysis engine 205 may include analysis data 222. Analysis data 222 may include a traffic light state or classification. For a traffic light, the state or classification may be, for example: green, yellow, red, green arrow (left or right), yellow arrow (left or right), red arrow (left or right), blinking green, blinking yellow, blinking red, etc. Each of these states represents a different action that a vehicle may or is required to perform at the intersection or other location at which the traffic light is located. Analysis data 222 may include a confidence score. The confidence score may indicate how confident the processing engine that supplied analysis data 222 is that the classification or state is accurate. A higher confidence score indicates that the processing engine is more confident that the state or classification is correct. A lower confidence score indicates that the processing engine is less confident that the state or classification is correct. In some embodiments, the traffic light classification and the confidence score may be combined as a single set of numbers; a probability of a particular traffic light classification may be provided for each possible traffic light classification. The traffic light classification with the highest associated probability is the traffic light classification determined to be correct by the processing engine that produced the results.

Analysis data 222 may include a timestamp. The timestamp may indicate at what time the captured traffic light image was captured or may indicate the time at which the traffic light classification and confidence score were determined by the processing engine that performed the analysis. Since scene analysis methods may execute at different frequencies, the timestamp of received sets of analysis data 222 may vary among scene analysis methods.

Analysis data 222 may be provided by analysis engine 205 to traffic light fusion engine 230. Analysis data 222 may be provided at differing times by each of analysis engines 205, which may be based on the amount of processing needing to be performed by the processing engine to create analysis data 222. Traffic light fusion engine 230 may have access to the most recent analysis data from each processing engine at a given time.

Generally, traffic light fusion engine 230 assesses the determined traffic light classifications and confidence scores from analysis engine 205 and determines a final or "fused" classification and a final or fused confidence. The traffic light fusion engine 230 may calculate a fused classification and fused confidence score periodically, such as once every 100 milliseconds. In other embodiments, traffic light fusion engine 230 may calculate results more or less frequently. Traffic light fusion engine 230 may only use results from analysis engine 205 that are sufficiently recent enough to qualify based on a defined time threshold from the current time being compared to the timestamp associated with each set of analysis data 222. If the analysis data 222 is determined to be too old based on the defined time threshold, it may be discarded or disregarded.

The following represents examples of equations that may be evaluated by traffic light fusion engine 230. These example equations assume that the traffic light being evaluated from captured traffic light images 201 has three possible states or classifications: green, yellow, and red. Which classifications are possible for a particular traffic light may be indicated in traffic light database 144 and may be accessible by onboard vehicle processing system 120. These equations can be modified for greater or fewer traffic light states being available at a given traffic light.

Equations 1-3 indicate how a weighted probability of each available traffic light state can be evaluated. In these equations, $P_G$ represents the weighted probability that the traffic light's state is green, $P_Y$ represents the weighted probability that the traffic light's state is yellow, and $P_R$ represents the weighted probability that the traffic light's state is red. In these equations, $P_{CV\_G}$ represents the probability that the traffic light is green as output by computer vision processing engine 210; $P_{CV\_Y}$ represents the probability that the traffic light is yellow as output by computer vision processing engine 210; and $P_{CV\_R}$ represents the probability that the traffic light is red as output by computer vision processing engine 210. In these equations, $P_{DL\_G}$ represents the probability that the traffic light is green as output by deep learning processing engine 220; $P_{DL\_Y}$ represents the probability that the traffic light is yellow as output by deep learning processing engine 220; and $P_{DL\_R}$ represents the probability that the traffic light is red as output by deep learning processing engine 220.

$$P_G = \alpha_G P_{CV\_G} + (1-\alpha_G) P_{DL\_G} \qquad \text{Eq. 1}$$

$$P_Y = \alpha_Y P_{CV\_Y} + (1-\alpha_Y) P_{DL\_Y} \qquad \text{Eq. 2}$$

$$P_R = \alpha_R P_{CV\_R} + (1-\alpha_R) P_{DL\_R} \qquad \text{Eq. 3}$$

In Equations 1-3, $\alpha_G$, $\alpha_Y$, and $\alpha_R$ represent the weight provided to each form of analysis. Therefore, for example, the greater the value of $\alpha_G$, the greater weight given to computer vision over deep learning for identifying a traffic light having a green state. Therefore, for identifying particular traffic light states, different weights may be used to preference one analysis method over another. For example, computer vision may be more effective at accurately identifying a green state of the traffic light while a deep learning method may be more effective at accurately identifying a red state of the traffic light.

Equations 4-6 may be used to determine $\widetilde{P_G}, \widetilde{P_Y}, \widetilde{P_R}$ and which are the normalized probabilities of the traffic light state being green, yellow, and red respectively.

$$\widetilde{P_G} = \frac{P_G}{P_G + P_Y + P_R} \qquad \text{Eq. 4}$$

$$\widetilde{P_Y} = \frac{P_Y}{P_G + P_Y + P_R} \qquad \text{Eq. 5}$$

$$\widetilde{P_R} = \frac{P_R}{P_G + P_Y + P_R} \qquad \text{Eq. 6}$$

To determine $\alpha_G$, $\alpha_Y$, and $\alpha_R$, offline weighting metric database 142, online weighting metric database 140, or both may be used. Regarding the offline weighting metrics, weight values may be determined remotely (e.g., by cloud-based server system 194 or some other remote system). Different values for $\alpha_G$, $\alpha_Y$, and $\alpha_R$ may be stored for various environmental conditions, including: time of day (day, night); lighting conditions; weather conditions, country or region where the traffic light or vehicle is located; and distance to the traffic light (e.g., different weighting based on the distance to the traffic light). To initially create $\alpha_G$, $\alpha_Y$, and $\alpha_R$ for each of these conditions, camera images may be captured from driving routes involving traffic lights when the environmental condition is present. A human operator may annotate each image with a correct indication of the traffic light state. An instance of analysis modules 205 (executed by some other system or vehicle than vehicle 101) may be executed for each of these images. Based on the output of each processing engine of analysis modules 205, precision, recall, and, using the precision and recall values, an Fi score may be computed, which can range from 1 (perfect accuracy) to 0. For example, using Equations 7-9, $\alpha_G$, $\alpha_Y$, and $\alpha_R$ can be calculated:

$$\alpha_{CV\_G} = \frac{F1_{CV\_G}}{F1_{CV\_G} + F1_{DL\_G}} \qquad \text{Eq. 7}$$

$$\alpha_{CV\_Y} = \frac{F1_{CV\_Y}}{F1_{CV\_Y} + F1_{DL\_Y}} \qquad \text{Eq. 8}$$

$$\alpha_{CV\_R} = \frac{F1_{CV\_R}}{F1_{CV\_R} + F1_{DL\_R}} \qquad \text{Eq. 9}$$

In some embodiments, offline weighting metrics may initially be used to determine the weighting of the output of analysis engine 205. After a time, online weighting metrics may augment or may be alternatively used to determine the offline weightings supplied by an external source. Online weighting metrics may be determined by onboard vehicle processing system 120 "on-the-fly" or in real-time as the vehicle is navigated up to and through intersections controlled by traffic lights.

Online weight metrics may be adjusted when the analyses of analysis engine 205 disagree on the traffic light state as indicated by the traffic light state given the highest probability of being correct by each processing engine. Online weighting engine 240 may use a traffic light sequence analysis to determine which processing engine is correct. A traffic light sequence analysis may analyze one or more future or one or more previous states of the traffic light to determine the state output by the processing engines. That is, traffic lights typically change state according to a defined pattern of green, followed by yellow, followed by red, and then the pattern repeating. Therefore, if a processing engine determines a traffic light state of yellow when the previous traffic light state was red, it is unlikely that the processing engine was correct in identifying the traffic light state as yellow, especially if a different processing engine identified the traffic light state as green, which is the next likely traffic light state according to the traffic light sequence analysis.

Based on the traffic light sequence analysis, if is determined that computer vision processing engine 210, for example, was incorrect in determining the traffic light state as green, Equation 10 may be performed to increase the weighting of deep learning processing engine 220 and decreasing the weighting of computer vision processing engine 210 for the final fused probability that the traffic light is green.

$$\alpha_{CV\_G} = \max(\alpha_{CV_{low\_thresh}}, (1-\beta)\alpha_{CV\_G}) \qquad \text{Eq. 10}$$

In Equation 10, β represents a predefined decrease factor that is used to determine an amount by which the weighting of computer vision processing engine 210 should be decreased in response to an incorrect determination of a green traffic light state. Equation 10 also defines a low threshold such that computer vision processing engine 210 may never been given below a predefined weighting. As such, even if computer vision processing engine 210 is repeatedly wrong, at least the low weighting threshold may be afforded to computer vision processing engine 210.

In contrast, if is determined that computer vision processing engine 210, for example, was correct in determining the traffic light state as green and deep learning processing engine 220 was incorrect, Equation 11 may be performed to decrease the weighting of deep learning processing engine 220 and increase the weighting of computer vision processing engine 210 for the final fused probability that the traffic light is green.

$$\alpha_{CV\_G} = \max(\alpha_{CV_{high\_thresh}}, (1+\beta)\alpha_{CV\_G}) \qquad \text{Eq. 11}$$

In Equation 11, β represents the predefined factor that is used to determine an amount by which the weighting of computer vision processing engine 210 should be increased in response to the correct determination of a green traffic light state. Equation 11 also defines a high threshold such that computer vision processing engine 210 may never have been given greater than a predefined weighting. As such, even if computer vision processing engine 210 is repeatedly correct when deep learning processing engine 220 is incorrect, computer vision processing engine 210 may not be afforded greater than the predefined high threshold weighting.

The previous example is focused on adjusting the weighting of a green state of a traffic light. Such equations can be used for adjusting the weighting for each traffic light state. Online weighting engine 240 may update the weighting values stored in online weighting metric database 140 based on the evaluation of Equations 10 and 11 for the particular traffic light state and can be used for a future evaluation of Equations 1-3 when online weighting metrics are to be used.

Online and offline weighting metrics may be used together. For instance, one or more offline weighting metrics for the current environmental conditions may be retrieved and averaged or otherwise combined with the weighting metrics determined via the online weighting process. Such an arrangement may provide a further accuracy improvement over using exclusively online or exclusively offline weighting metrics. Alternatively, offline weighting metrics may be used for a predetermined amount of time or number of traffic lights while online weighting metrics are calculated in the background. After the predetermined amount of time or the predetermined number of traffic lights, the determined online weighting metrics may be used for determining the weighting and may continue to be updated.

The output 232 of traffic light fusion engine 230 may be a fused traffic light classification and a fused confidence score. In some embodiments, the output of traffic light fusion engine 230 may be in the form of a probability of each possible traffic light state. The traffic light state with the highest probability represents the traffic light state determined to be the correct traffic light state by traffic light fusion engine 230 based on the online and/or offline weighting metrics.

Figure 3:
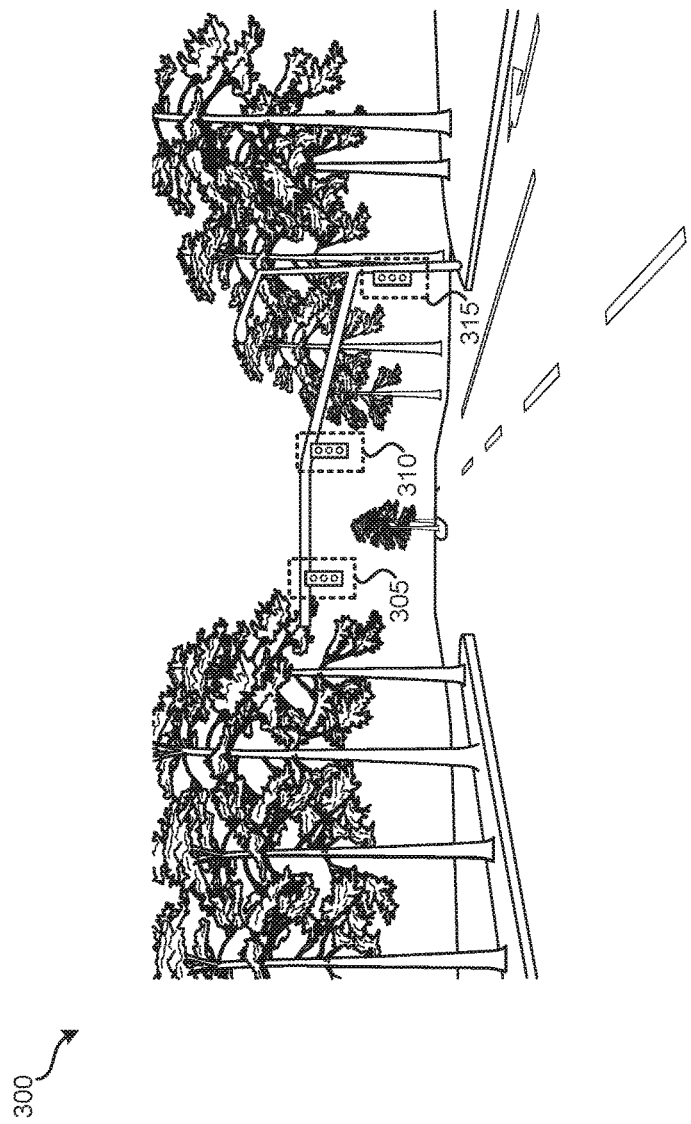
FIG. 3 illustrates an embodiment of a view from a vehicle approaching a traffic light.

FIG. 3 illustrates an embodiment of a scene 300 from a vehicle approaching a traffic light. Scene 300 may be captured using a camera (e.g., short-range camera 132) in front of vehicle 101. Based on data in traffic light database 144, the location of traffic lights 305, 310, and 315 may be identified. The current states or classifications of traffic lights 305, 310, and 315 may be repeatedly analyzed by on-board vehicle processing system 120.

Figure 4:
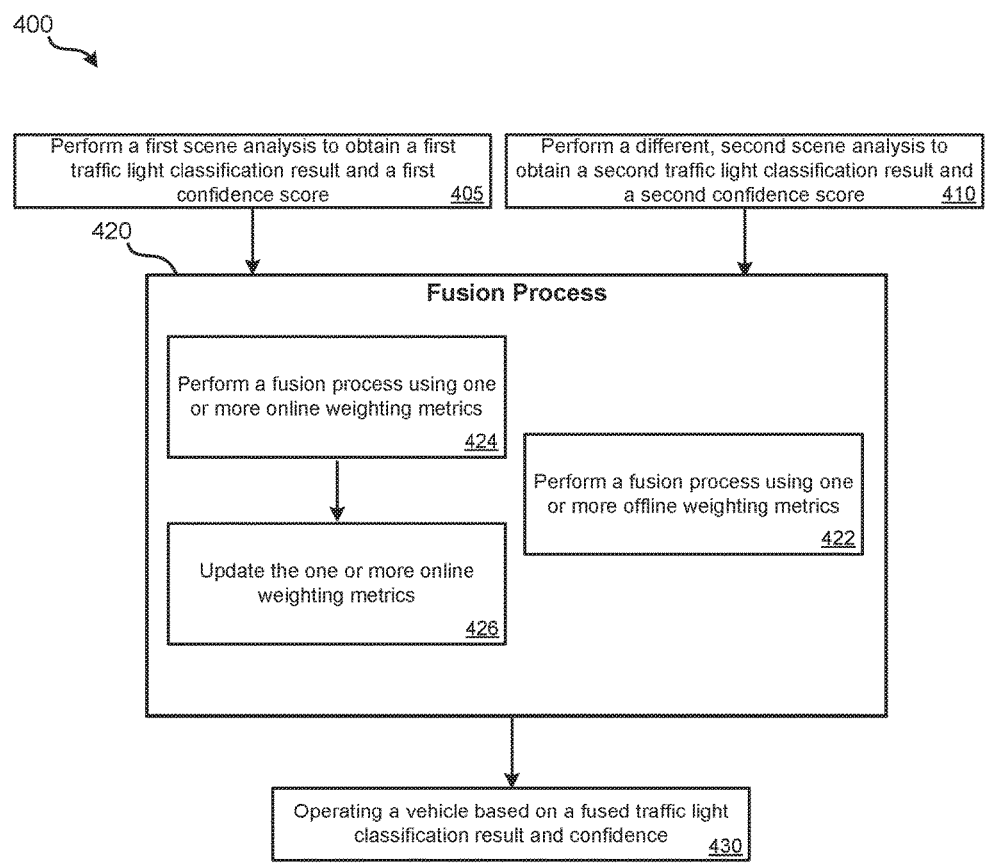
FIG. 4 illustrates an embodiment of a method for determining a state of a traffic light.

Various methods may be performed using the systems of FIGS. 1 and 2. FIG. 4 illustrates an embodiment of a method 400 for determining a state of a traffic light. Method 400 may be performed by onboard vehicle processing system 120 of autonomous driving system 110 of FIG. 1. In other embodiments, method 400 may be performed using an alternate system or device that performs the functions of onboard vehicle processing system 120 detailed in relation to FIG. 2.

Blocks 405 and 410 may be performed contemporaneously and repeatedly, at the same frequency or at different frequencies. At block 405, a first scene analysis on a recently captured image is performed to obtain a traffic light classification or state and a confidence score. In some embodiments, the traffic light classification and confidence score is in the form of a probability of each possible traffic light state. In some embodiments, the first scene analysis may be a computer vision process. At block 410, a second scene analysis on a recently captured image (which may be the same image used at block 405 or another captured image) is performed to obtain a second traffic light classification or state and a second confidence score. In some embodiments, the traffic light classification and confidence score is in the form of a second set of probabilities of each possible traffic light state. In some embodiments, the first scene analysis may be a deep learning process. In other embodiments, rather than blocks 405 and 410 respectively using computer vision and deep learning, different scene analysis methods or images (or data) obtained from different sensors may be used. For instance, block 405 may use an image captured using a short-range camera while block 405 uses an image captured using a long-range camera. In such an example, the scene analysis method used at each block may be the same (e.g., computer vision, deep learning, or some other scene analysis method). In other embodiments, more than two scene analysis blocks may be performed. For example, four blocks may be performed, such as: computer vision on an image captured using a short-range camera, computer vision on an image captured using a long-range camera; deep learning on an image captured using the short-range camera; and deep learning on an image captured using a long-range camera.

At block 420, a fusion process may be performed. The fusion process may involve: 1) block 422; 2) blocks 424 and 426; or 3) blocks 422 through 426. Referring first to block 422, fusion of the results from blocks 405 and 410 may be performed using one or more offline weighting metrics. To select which offline weighting metrics are to be used, data regarding the current environmental condition of the vehicle may be collected and analyzed, including: the time of day, the lighting conditions, the distance to the traffic light, the country or geographic region in which the vehicle located, etc. Based on these environmental conditions, a database of offline weighting metrics may be accessed to retrieve the one or more relevant offline weighting metrics that were provided from a source external to the onboard vehicle processing system performing method 400. For example, these offline weighting metrics may be determined (e.g., as detailed in relation to Equations 7-9) by a provider or manufacturer of an autonomous driving system and occasionally updated at each autonomous driving system. Using the one or more offline weighting metrics determined to be relevant, the fusion process may apply Equations 1-6 to obtain a fused classification and fused confidence (e.g., in the form of a probability of each possible traffic light state).

Referring now to block 424, a fusion process may be performed that involves using one or more online weighting metrics. These online weighting metrics may be stored and accessed to perform the fusion process of the results obtained from blocks 405 and 410. Using the one or more online weighting metrics determined to be relevant, the fusion process may apply Equations 1-6 to obtain a fused classification and fused confidence (e.g., in the form of a probability of each possible traffic light state).

An online weighting metric may be updated each time that the first scene analysis disagrees with the result of the second scene analysis (e.g., the traffic light state indicated to have the highest probability by each scene analysis method does not match). A process to update the online weighting metrics may be performed at block 426 as detailed in relation to Equations 10 and 11. That is, when one scene analysis method is determined to be correct while another scene analysis method is determined to be incorrect (e.g., based on a traffic light sequence analysis), the weighting of the former analysis method is increased and the weighting of the latter scene analysis method is decreased by some factor (e.g., a predefined factor).

At block 430, based at least in part on the fused output of the fusion process of block 420, onboard vehicle processing system 120 may pilot the vehicle on which the autonomous driving system is incorporated. Such actions can include braking or stopping for a traffic light determined to be red and proceeding through an intersection for a traffic light determined to be green.

Figure 5:
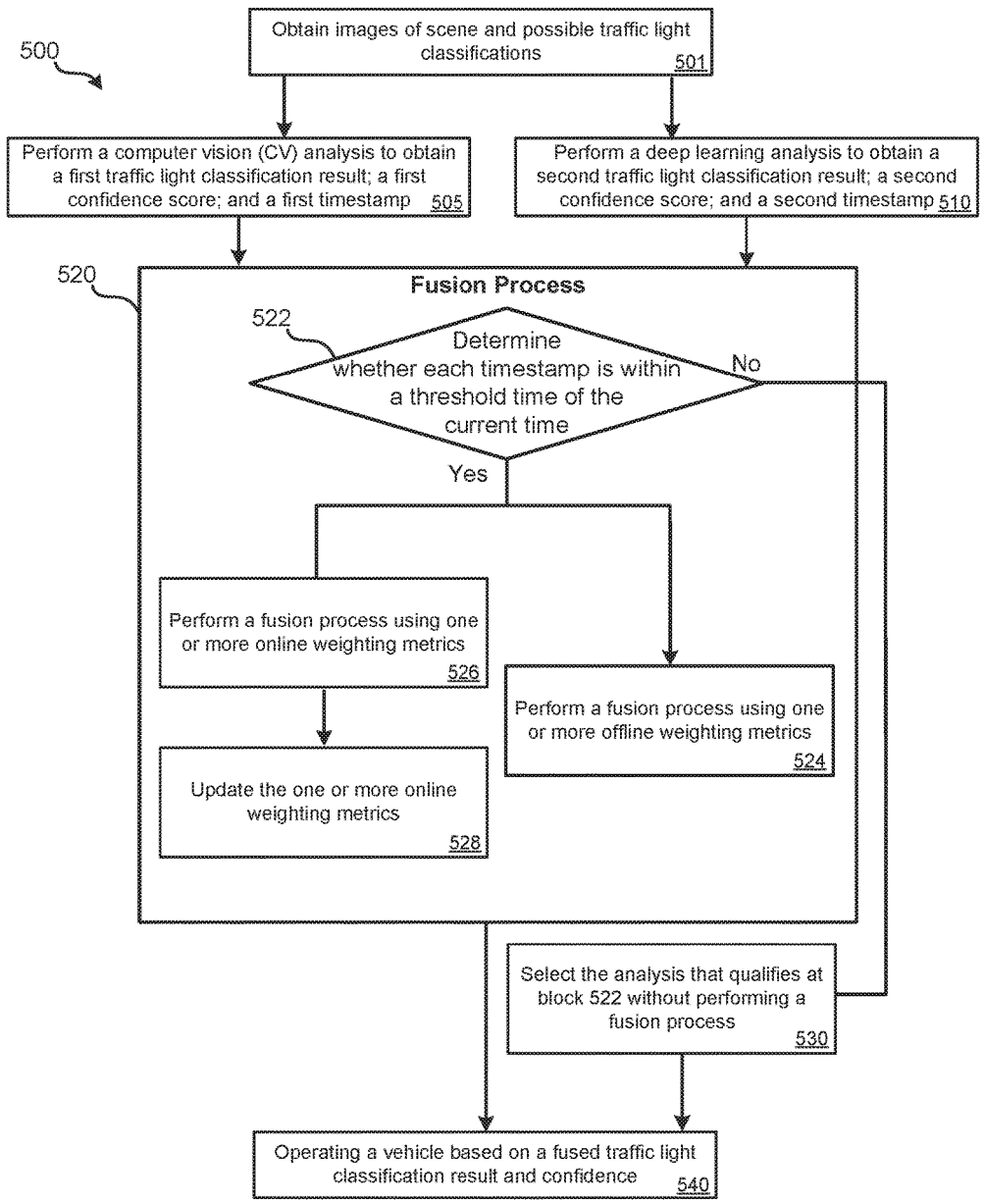
FIG. 5 illustrates another embodiment of a method for determining a state of a traffic light.

FIG. 5 illustrates another embodiment of a method 500 for determining a state of a traffic light. Method 500 may be performed by onboard vehicle processing system 120 of autonomous driving system 110 of FIG. 1. In other embodiments, method 500 may be performed using an alternate system or device that performs the functions of onboard vehicle processing system 120 detailed in relation to FIG. 2. Method 500 can represent a more detailed embodiment of method 400.

At block 501, images of a scene in which a traffic light is present may repeatedly be performed. These images may be supplied to the components performing blocks 505 and 510 or the components performing blocks 505 and 510 can retrieve a most-recent image when needed for analysis. Therefore, the outputs fused from blocks 505 and 510 at block 520 may not necessarily be based on the same captured image. In some embodiments, additionally as part of block 501, an indication of which traffic light states or classifications are possible at a traffic light included in the images is determined. These possible states may be obtained from a traffic light database which is kept up-to-date with possible traffic light states. For instance, "left green arrow" may only be an available state if the traffic light database indicates that the traffic light does have a left green arrow. In other embodiments, all possible traffic light states are possible to be determined at each traffic light analyzed.

Blocks 505 and 510 may be performed contemporaneously and repeatedly, at the same frequency or at different frequencies. At block 505, a computer vision analysis on a recently captured image is performed to obtain a traffic light classification or state and a confidence score. In some embodiments, the traffic light classification and confidence score are in the form of a probability of each possible traffic light state. The output of block 505 may additionally include a timestamp that indicates the time at which the analysis of block 505 was completed or alternatively indicates the time at which the image was captured on which the analysis of block 505 was performed. At block 510, a deep learning analysis on a recently captured image (which may be the same image used at block 505 or another captured image) is performed to obtain a second traffic light classification or state and a second confidence score. In some embodiments, the traffic light classification and confidence score are in the form of a second set of probabilities of each possible traffic light state. The output of block 510 may additionally include a timestamp that indicates the time at which the analysis of block 510 was completed or alternatively indicates the time at which the image was captured on which the analysis of block 505 was performed.

In other embodiments, rather than blocks 505 and 510 respectively using computer vision and deep learning, different scene analysis methods or images (or data) obtained from different sensors may be used. For instance, block 505 may use an image captured using a short-range camera while block 505 uses an image captured using a long-range camera. In such an example, the scene analysis method used at each block may be the same (e.g., computer vision, deep learning, or some other scene analysis method). In other embodiments, more than two scene analysis blocks may be performed. For example, four blocks may be performed, such as: computer vision on an image captured using a short-range camera, computer vision on an image captured using a long-range camera; deep learning on an image captured using the short-range camera; and deep learning on an image captured using a long-range camera.

At block 520, a fusion process may be performed. The fusion process of block 520 may be performed periodically independently of when blocks 505 and 510 are performed. Block 522 may be used to determine if the outputs of blocks 505 and 510 are eligible to be used for the fusion process. In order to be eligible, the timestamp received as part of the output from block 505 or 510 may be required to be within a threshold time of the time at which block 522 is being performed. For example, if the timestamp indicates that an output from either block 505 or block 510 is more than 150 ms old, the output from that particular block may be discarded. If the output from a block is discarded, method 500 may proceed to block 530 and use the output of the analysis that did qualify as temporally valid at block 522. For example, if the time threshold is 150 ms and it is determined at block 522 that the output of block 505 is 97 ms old and the output of block 510 is 168 ms old, the output of block 510 may be discarded and the output of block 505 may be used at block 530 without a fusion process being performed. If both of the outputs of blocks 505 and 510 fail to qualify as temporally valid, neither blocks 520 and 530 may be performed. If both of the outputs of blocks 505 and 510 qualify as temporally valid, the fusion process of block 520 continues to blocks 524 and/or 526.

The fusion process may involve: 1) block 524; 2) blocks 526 and 528; or 3) blocks 524 through 528. Referring first to block 524, fusion of the results from blocks 505 and 510 may be performed using one or more offline weighting metrics. To select which offline weighting metrics are to be used, data regarding the current environmental condition of the vehicle may be collected and analyzed, including: the time of day, the lighting conditions, the distance to the traffic light, and the country or geographic region in which the vehicle located, etc. Based on these environmental conditions, a database of offline weighting metrics may be accessed to retrieve the one or more relevant offline weighting metrics that were provided from a source external to the onboard vehicle processing system performing method 500. For example, these offline weighting metrics may be determined (e.g., as detailed in relation to Equations 7-9) by a provider or manufacturer of an autonomous driving system and occasionally updated at each autonomous driving system. Using the one or more offline weighting metrics determined to be relevant, the fusion process may apply Equations 1-6 to obtain a fused classification and fused confidence (e.g., in the form of a probability of each possible traffic light state).

Referring now to block 526, a fusion process may be performed that involves using one or more online weighting metrics. These online weighting metrics may be stored and accessed to perform the fusion process of the results obtained from blocks 505 and 510. Using the one or more online weighting metrics determined to be relevant, the fusion process may apply Equations 1-6 to obtain a fused classification and fused confidence (e.g., in the form of a probability of each possible traffic light state).

An online weighting metric may be updated each time that the first scene analysis disagrees with the result of the second scene analysis (e.g., the traffic light state indicated to have the highest probability by each scene analysis method does not match). A process to update the online weighting metrics may be performed at block 528 as detailed in relation to Equations 10 and 11. That is, when one scene analysis method is determined to be correct while another scene analysis method is determined to be incorrect (e.g., based on a traffic light sequence analysis), the weighting of the former analysis method is increased and the weighting of the latter scene analysis method is decreased by some factor (e.g., a predefined factor).

At block 540, based at least in part on the fused output of the fusion process of block 520 or the output of block 530, onboard vehicle processing system 120 may pilot the vehicle on which the autonomous driving system is incorporated. Such actions can include braking or stopping for a traffic light determined to be red and proceeding through an intersection for a traffic light determined to be green.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for determining a state of a traffic light, the method comprising:
    performing, by an onboard vehicle processing system, a first analysis of a scene that includes the traffic light, wherein the first analysis outputs a first plurality of probabilities, wherein each probability of the first plurality of probabilities corresponds to a different traffic light state;
    performing, by the onboard vehicle processing system, a second analysis of the scene that includes the traffic light, wherein:
        the second analysis is a different type of analysis than the first analysis;
        the second analysis outputs a second plurality of probabilities; and
        each probability of the second plurality of probabilities corresponds to a different traffic light state;
    performing, by the onboard vehicle processing system, a fusion process to fuse the first plurality of probabilities indicative of the state of the traffic light and the second plurality of probabilities indicative of the state of the traffic light into a fused classification result, wherein the fusion process is based on at least one weighting metric selected from a group consisting of: an offline weighting metric; and an online weighting metric;
    determining the online weighting metric, which comprises:
        determining that a first traffic light state having a first greatest probability of the first plurality of probabilities is different than a second traffic light state having a second greatest probability of the second plurality of probabilities;
        in response to determining the first traffic light state is different than the second traffic light state, performing a traffic light sequence analysis to determine an expected classification result; and
        comparing the expected classification result from the traffic light sequence analysis to the first traffic light state and the second traffic light state; and
    driving, by the onboard vehicle processing system, a vehicle at least partially based on the fused classification result.

2. The method for determining the state of the traffic light of claim 1, wherein the first analysis comprises using a computer vision analysis and the second analysis comprises using a deep learning analysis.

3. The method for determining the state of the traffic light of claim 1, wherein the first analysis additionally outputs a first timestamp and the second analysis additionally outputs a second timestamp.

4. The method for determining the state of the traffic light of claim 3, wherein the first timestamp and the second timestamp are compared to a defined time threshold to determine that the performed first analysis and the performed second analysis are sufficiently recent.

5. The method for determining the state of the traffic light of claim 1, wherein the offline weighting metric is based on weather, distance, time-of-day, or some combination thereof.

6. The method for determining the state of the traffic light of claim 1, wherein the online weighting metric comprises:
    decreasing a first amount of weight applied to the first analysis based on the first traffic light state not matching the expected classification result from the traffic light sequence analysis; and
    increasing a second amount of weight applied to the second analysis based on the second traffic light state matching the expected classification result from the traffic light sequence analysis.

7. The method for determining the state of the traffic light of claim 6, wherein the first amount of weight applied to the first analysis is decreased only if the first weighting is greater than a minimum weighting threshold.

8. The method for determining the state of the traffic light of claim 1, wherein: the first analysis comprises analyzing a first image of the scene captured using a long-range image sensor and the second analysis comprises analyzing a second image of the scene captured using a short-range image sensor.

9. A system for determining a state of a traffic light, the system comprising:
    one or more image sensors attached with a vehicle;
    an onboard vehicle processing system, comprising one or more processors, that receives images from the one or more image sensors, wherein the onboard vehicle processing system is located onboard the vehicle, wherein the one or more processors are configured to:
        perform a first analysis of a scene from a first image received from the one or more image sensors that includes the traffic light, wherein the first analysis outputs a first plurality of probabilities, wherein each probability of the first plurality corresponds to a different traffic light state;
        perform a second analysis of the scene from a second image received from the one or more image sensors that includes the traffic light, wherein:
            the second analysis is a different type of analysis than the first analysis;
            the second analysis outputs a second plurality of probabilities; and
            each probability of the second plurality corresponds to a different traffic light state;
        perform a fusion process to fuse the first plurality of probabilities indicative of the state of the traffic light and the second plurality of probabilities indicative of the state of the traffic light into a fused classification result, wherein the fusion process is based on at least one weighting metric selected from a group consisting of: an offline weighting metric; and an online weighting metric, wherein: the online weighting metric is determined by the one or more processors of the onboard vehicle processing system being configured to:
            determine that a first traffic light state having a first greatest probability of the first plurality of probabilities is different than a second traffic light state having a second greatest probability of the second plurality of probabilities;
            perform a traffic light sequence analysis to determine an expected classification result in response to determining the first traffic light state is different than the second traffic light state; and
            compare the expected classification result from the traffic light sequence analysis to the first traffic light state and the second traffic light state; and
        drive the vehicle at least partially based on the fused classification result.

10. The system for determining the state of the traffic light of claim 9, wherein the first analysis comprises the onboard vehicle processing system using a computer vision analysis and the second analysis comprises the onboard vehicle processing system using a deep learning analysis.

11. The system for determining the state of the traffic light of claim 9, wherein the first analysis comprises additionally outputs a first timestamp and the second analysis additionally outputs a second timestamp.

12. The system for determining the state of the traffic light of claim 11, wherein the one or more processors are further configured to compare the first timestamp and the second timestamp to a defined time threshold to determine that the performed first analysis and the performed second analysis are sufficiently recent.

13. The system for determining the state of the traffic light of claim 9, wherein the offline weighting metric is based on weather, distance, time-of-day, or some combination thereof.

14. The system for determining the state of the traffic light of claim 9, wherein the online weighting metric further comprises the one or more processors of the onboard vehicle processing system being configured to:
　decrease a first amount of weight applied to the first analysis based on the first traffic light state not matching the expected classification result from the traffic light sequence analysis; and
　increase a second amount of weight applied to the second analysis based on the second traffic light state matching the expected classification result from the traffic light sequence analysis.

15. The system for determining the state of the traffic light of claim 14, wherein the first amount of weight applied to the first analysis is decreased only if the first weighting is greater than a minimum weighting threshold.

16. The system for determining the state of the traffic light of claim 9, wherein: the first analysis comprises the one or more processors being configured to analyze the first image of the scene captured using a long-range image sensor of the one or more image sensors and the second analysis comprises analyzing a second image of the scene captured using a short-range image sensor of the one or more image sensors.

17. The system for determining the state of the traffic light of claim 9, wherein the first image and the second image are the same image.

18. A non-transitory processor-readable medium for determining the state of a traffic light comprising processor-readable instructions configured to cause one or more processors to:
　perform a first analysis of a scene from a first image that includes the traffic light, wherein the first analysis outputs a first plurality of probabilities, wherein each probability of the first plurality corresponds to a different traffic light state; perform a second analysis of the scene from a second image that includes the traffic light, wherein:
　　the second analysis is a different type of analysis than the first analysis;
　　the second analysis outputs a second plurality of probabilities; and
　　each probability of the second plurality corresponds to a different traffic light state;
　perform a fusion process to fuse the first plurality of probabilities indicative of the state of the traffic light and the second plurality of probabilities indicative of the state of the traffic light into a fused classification result, wherein the fusion process is based on at least one weighting metric selected from a group consisting of: an offline weighting metric; and an online weighting metric, wherein: the online weighting metric is determined by the processor-readable instructions being configured to cause the one or more processors to:
　　determine that a first traffic light state having a first greatest probability of the first plurality of probabilities is different than a second traffic light state having a second greatest probability of the second plurality of probabilities;
　　perform a traffic light sequence analysis to determine an expected classification result in response to determining the first traffic light state is different than the second traffic light state; and
　　compare the expected classification result from the traffic light sequence analysis to the first traffic light state and the second traffic light state; and
　cause a vehicle to be driven at least partially based on the fused classification result.

* * * * *